(12) United States Patent
Sion

(10) Patent No.: US 10,765,018 B2
(45) Date of Patent: Sep. 1, 2020

(54) TAMPER-PROOF COMPUTER DEVICE

(71) Applicant: PRIVATE MACHINES INC., Brooklyn, NY (US)

(72) Inventor: Radu Sion, Brooklyn, NY (US)

(73) Assignee: Private Machines Inc., Brooklyn, NY (US)

(*) Notice: Subject to any disclaimer, the term of this patent is extended or adjusted under 35 U.S.C. 154(b) by 0 days.

(21) Appl. No.: 16/363,445

(22) Filed: Mar. 25, 2019

(65) Prior Publication Data

US 2019/0307000 A1   Oct. 3, 2019

Related U.S. Application Data

(60) Provisional application No. 62/649,488, filed on Mar. 28, 2018.

(51) Int. Cl.
| | |
|---|---|
| *G06F 1/20* | (2006.01) |
| *H05K 5/02* | (2006.01) |
| *G06F 1/16* | (2006.01) |
| *H05K 7/20* | (2006.01) |
| *H05K 13/04* | (2006.01) |
| *G06F 1/18* | (2006.01) |
| *G06F 21/86* | (2013.01) |

(52) U.S. Cl.
CPC ......... *H05K 5/0208* (2013.01); *G06F 1/1677* (2013.01); *G06F 1/182* (2013.01); *G06F 1/20* (2013.01); *G06F 21/86* (2013.01); *H05K 7/20163* (2013.01); *H05K 13/04* (2013.01)

(58) Field of Classification Search
None
See application file for complete search history.

(56) References Cited

U.S. PATENT DOCUMENTS 8,325,486 B2    12/2012  Arshad et al.
9,521,764 B2 *  12/2016  Steiner ................... B33Y 80/00
(Continued)

FOREIGN PATENT DOCUMENTS

WO    2006133429 A2    12/2006
WO    2016137573 A1     9/2016

*Primary Examiner* — Xanthia C Cunningham
(74) *Attorney, Agent, or Firm* — The Law Office of Daniel T. Weglarz, P.C.

(57) ABSTRACT

Tamper-proof computer device (1) comprising
a sealed enclosure (10), in turn comprising a hollow metal body (20) having an inside surface (22);
a computer processor (30), arranged inside said enclosure (10);
a tamper-detection sensor (40), which sensor (40) in turn comprises a tamper-detecting membrane (40) forming a sealed container in which the computer processor (30) is arranged, which membrane (40) is arranged on, and in direct thermal contact with, the said hollow metal body (20); and
a metal heat sink structure (50) thermally connected to the computer processor (30),
wherein the metal heat sink structure (50) is also arranged in direct thermal contact with a side of the membrane (40) not facing the said inside surface (22), so that the membrane (40) is sandwiched between the hollow metal body (20) and the metal heat sink structure (50) so that thermal connection is achieved between the metal heat sink structure (50) and the enclosure (10), via the membrane (40).

The invention also relates to a method for manufacturing such a computer device.

32 Claims, 15 Drawing Sheets

(56) References Cited

U.S. PATENT DOCUMENTS

| | | |
|---|---|---|
| 9,978,231 B2 | 5/2018 | Isaacs |
| 10,178,800 B2 * | 1/2019 | Mahalingam ...... H05K 7/20163 |
| 2005/0275538 A1 * | 12/2005 | Kulpa .................. H05K 5/0208 |
| | | 340/568.2 |
| 2006/0067054 A1 | 3/2006 | Wang et al. |
| 2009/0109611 A1 | 4/2009 | Anderl et al. |
| 2009/0219679 A1 * | 9/2009 | Moore ................. H05K 5/0213 |
| | | 361/679.31 |
| 2010/0177487 A1 | 7/2010 | Arshad et al. |
| 2012/0050998 A1 | 3/2012 | Klum et al. |
| 2015/0323262 A1 | 11/2015 | Kim |
| 2015/0327353 A1 | 11/2015 | Dickover et al. |
| 2017/0116830 A1 | 4/2017 | Isaacs |
| 2017/0316228 A1 | 11/2017 | Campbell et al. |

\* cited by examiner

TAMPER-PROOF COMPUTER DEVICE

The present invention relates to a tamper-proof computer device, comprising a tamper-proof encapsulation or enclosure for electronics. For instance, the tamper-proof computer device may be a racked computer.

For high-performance computing, cooling is conventionally an issue that needs to be handled. In general, the more powerful computing power of a particular piece of computer equipment, the more cooling is required to avoid overheating. Especially in server rooms comprising many servers, cooling is a main concern.

Such cooling is conventionally taken care of using air or liquid convection, for instance using internal or external fans, external cold air supplies, liquid cooling loops, etc. Also, heat sinks in the form of internally arranged solid heat dissipation structures, such as metal heat bridges, may be used to transport heat away from heat sources such as computer processors.

For the class of computer devices that are "tamper-proof", in other words devices equipped with hardware arranged to prevent and detect physical tampering, cooling presents particular problems. Namely, arranging a computer device to be tamper-proof, such a device typically needs to be sealed so that unauthorized tampering attacks from the outside can be prevented, or at least detected. For instance, tamper-detection sensors used may include breakage-detecting foils or membranes extending across large parts of the computer device, or even enclosing the entire device. Hence, in such tamper-proof computer devices, it is not possible to use an internal fan to efficiently remove heat, since the device enclosure cannot contain through openings allowing air to enter or exit the enclosure.

Instead of arranging efficient cooling mechanisms, such tamper-proof computer devices conventionally use components with less computing power, hence dissipating less thermal energy during operation. It is also often the case that such tamper-proof computer devices are completely filled with a potting material, such as epoxy or similar, not allowing heat to dissipate efficiently.

This is a problem, since such conventional tamper-proof computer devices must use low-power processors and other electronics, providing less powerful devices than optimal.

Hence, it would be desirable to provide an effectively tamper-proof computer device which can still make use of high-performance computing components without leading to overheating.

The present invention solves the above described problems.

SUMMARY OF INVENTION

Hence, the invention relates to a tamper-proof computer device comprising a sealed enclosure, in turn comprising a hollow metal body having an inside surface; a computer processor, arranged inside said enclosure; a tamper-detection sensor, which sensor in turn comprises a tamper-detecting membrane forming a sealed container in which the computer processor is arranged, which membrane is arranged on, and in direct thermal contact with, the said hollow metal body; and a metal heat sink structure thermally connected to the computer processor, wherein the metal heat sink structure is also arranged in direct thermal contact with a side of the membrane not facing the said inside surface, so that the membrane is sandwiched between the hollow metal body and the metal heat sink structure so that thermal connection is achieved between the metal heat sink structure and the enclosure, via the membrane.

Furthermore, the invention relates to a method for manufacturing a tamper-proof computer device of the said type, wherein the method comprises the steps a) providing a first and a second enclosure part, as well as a first and a second tamper-detecting membrane part; b) arranging the first membrane part so that it covers an inside surface of the first enclosure part, and arranging the second membrane part so that it covers an inside surface of the second enclosure part; c) bringing the first and second enclosure parts together, so that they together form a closed a hollow metal body having an inside surface which is covered by said first and second membrane parts, which hollow metal body encloses a comprising a computer processor, wherein the first and second membrane parts are pressed together between said first and second enclosure parts along a closed periphery along the hollow metal body; and d) permanently sealing the hollow metal body using an adhesive applied along an adhesive joint arranged along said closed periphery.

BRIEF DESCRIPTION OF DRAWINGS

In the following, the invention will be described in detail, with reference to exemplifying embodiments of the invention and to the enclosed drawings, wherein:

FIGS. 1-12 and 14-15 share the same reference numerals for same parts.

DETAILED DESCRIPTION OF THE INVENTION

Figure 1:
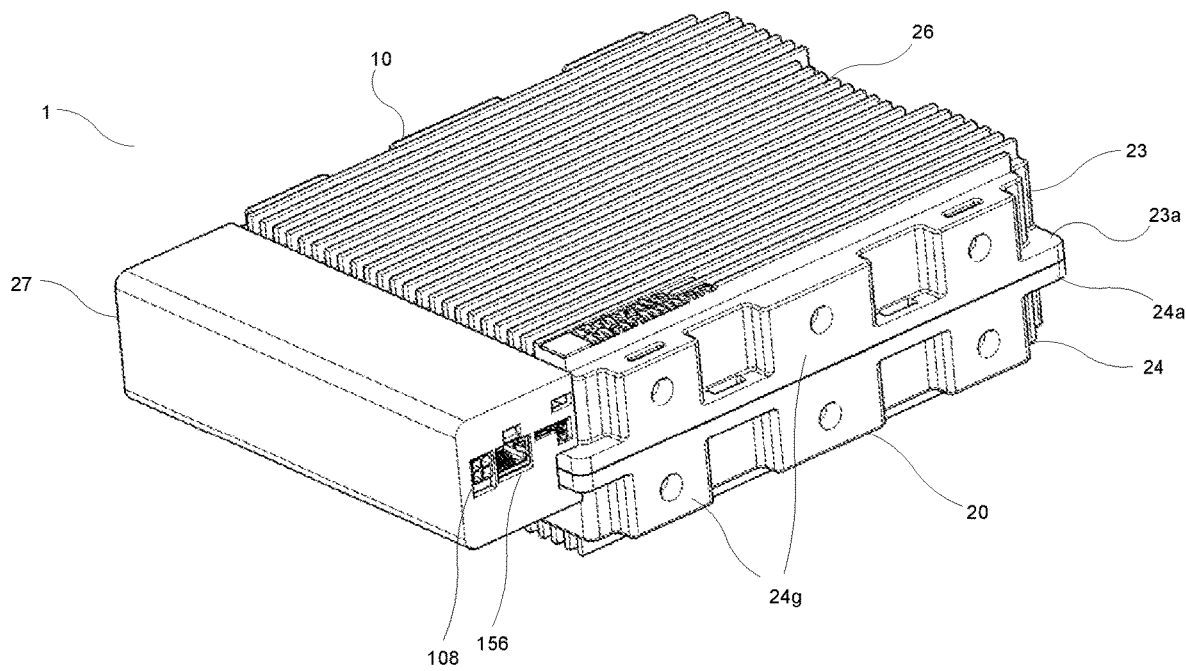
FIGS. 1 and 2 are respective perspective views of a tamper-proof computer device according to the invention.
Figure 2:
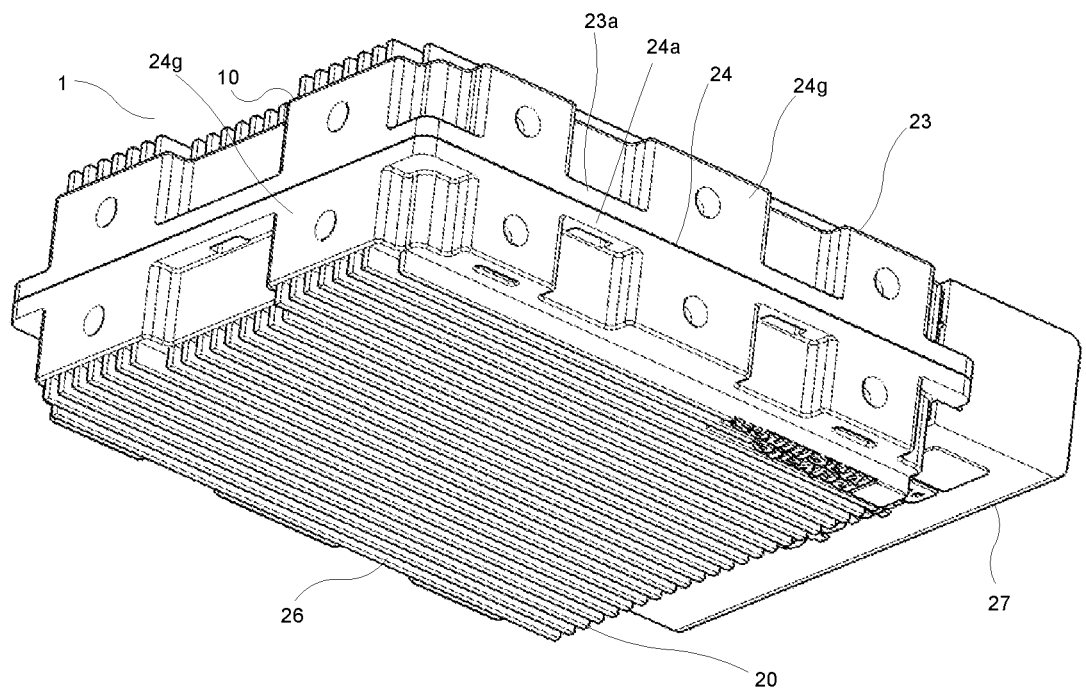
Figure 3:
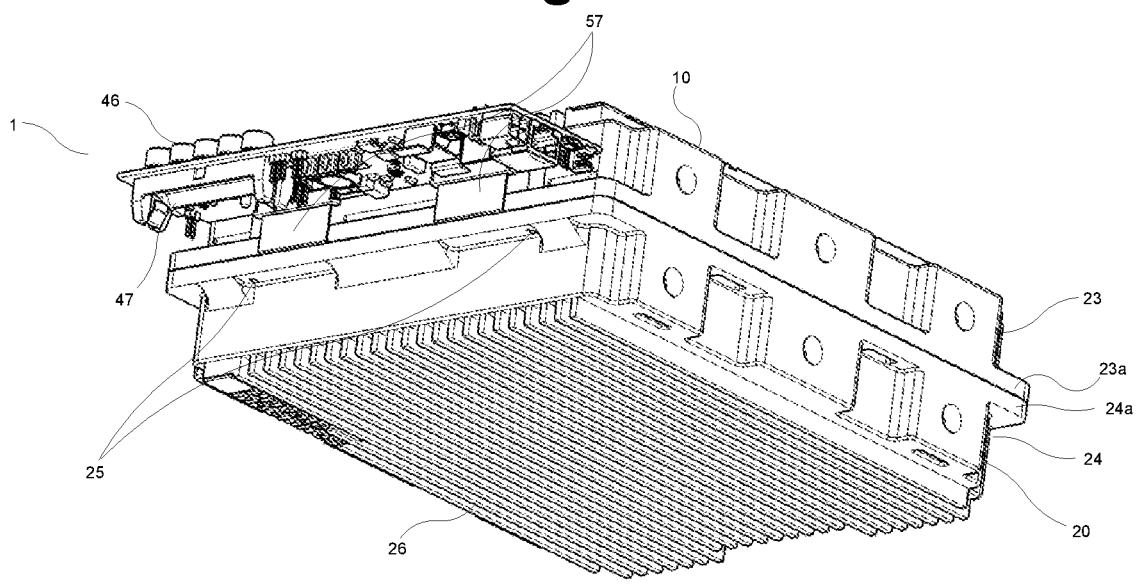
FIG. 3 is another perspective view of the device illustrated in FIGS. 1 and 2, but with an external circuitry cover removed.

Hence, in the Figures, an exemplifying tamper-proof computer device 1 according to the present invention is illustrated. The tamper-proof computer device 1 comprises a sealed enclosure 10, in turn comprising a hollow metal body 20 which may constitute the enclosure 10 or constitute a part of the enclosure 10. The hollow metal body 20 has an inside surface 22, facing a hollow interior 21 of the enclosure 10, and possibly also substantially defining a surrounding limiting surface of the said hollow interior 21.

The computer device 1 further comprises a computer processor (CPU) 30, arranged inside the enclosure 10, which computer processor 30 may hence be arranged completely within the said hollow metal body 20 and furthermore inside said hollow interior 21 of the enclosure 10. The computer processor 30 may be a main CPU of the computer device 1, such as a main CPU comprising one or several processor cores and arranged to cooperate with an external or internal graphics processor. In some embodiments, all tamper-protected computer processing units of the computer device 1 may be arranged inside said enclosure 10 in a way corresponding to what has been said regarding the computer processor 30. It may furthermore be so that all tamper-protected parts of the computer device 1 constituting thermal energy sources are arranged inside said enclosure 10 in the corresponding way. In this context, a "tamper-protected" component is a component which is protected from tampering using a tamper-protection system of the computer device 1.

Hence, the externally arranged tamper-protection circuitry 46 (described below) itself is not such tamper-protected components, but rather constitutes a part of the tamper-protection system. Correspondingly, the internally arranged tamper-protection circuitry 32 (also described below) may not be tamper-protected in this sense, even though the internal tamper-protection circuitry 32 may in fact be tamper-protected in this sense in the case described below in which the internal tamper-protection circuitry 32 is arranged inside the tamper-detection membrane 41, enjoying the tamper-protection offered by this membrane 41. In FIGS. 1-11, the tamper-protected circuitry inside the hollow metal body 20 is exemplified by, among other things, a circuit board 31, connected with the CPU 30, and in particular by the below-described information processing module 128.

The computer device 1 further comprises a tamper-detection sensor 40, which tamper-detection sensor 40 in turn comprises a tamper-detecting membrane 41 forming a sealed container in which the computer processor 30 is arranged. In a way corresponding to what has been said above, all tamper-protected parts of the computer device 1, and in particular all tamper-protected thermal energy sources, in particular all tamper-protected computer processing units, may be arranged within said sealed container. That the membrane 41 forms a "sealed container" means that the container encloses and defines an interior volume which is sealed in the sense that it is not possible to reach the interior volume from the outside without penetrating the membrane 41, or otherwise affecting the integrity of the membrane 41 in a way which is detected by the tamper-detection sensor 40.

The membrane 41 is arranged on, and in direct thermal contact with, the said hollow metal body 20.

As used herein, that two parts are in "direct thermal contact" with each other is intended to mean that the two parts are either in direct physical contact with each other, or connected via a thin intermediate material (preferably an intermediate material with a thickness of maximally 2 mm, more preferably of maximally 1 mm), which intermediate material has good thermal conduction properties and hence does not substantially affect thermal transfer between the two parts in question. Examples of such intermediate materials include adhesive and thermal pads of the below described type. It is noted, for clarity, that such intermediate material will not be a gas.

Furthermore, the computer device 1 comprises a metal heat sink structure 50, which is thermally connected to the computer processor 30. The term "thermal connection", as used herein, is to be understood as a connection that allows thermal energy to transfer between two connected components with insignificant loss, either via a direct physical contact between two such connected components or via a thermally conductive or thin intermediate material, which intermediate material does not insulate the two components thermally from each other. With respect to the metal heat sink structure 50, the computer processor 30 is preferably mounted on the metal heat sink structure 50 so that direct physical contact is established between the metal heat sink structure 50 and the computer processor 30, such as the computer processor 30 being glued or screwed directly on the metal heat sink structure 50.

Furthermore according to the invention, the metal heat sink structure 50 is also arranged in direct thermal contact with a side 44 of the membrane 41 not facing the said inside surface 22 of the hollow metal body 20. Hence, the membrane 41 is arranged between the hollow metal body 20 and the metal heat sink structure 50, in particular between the said inside surface 22 of the hollow metal body 20 and a corresponding external surface 53 of the metal heat sink structure 50 facing the membrane 41. In particular, the membrane 41 is sandwiched between the hollow metal body 20 and the metal heat sink structure 50 so that thermal connection is achieved between the metal heat sink structure 50 and the enclosure 10, via the membrane 41.

This way, thermal energy produced by the computer processor 30 is transferred, by the metal heat sink structure 50, from the computer processor 30 to the enclosure 10, via the thermal connection between the metal heat sink structure 50 and the enclosure 10 which in turn is made possible using the sandwich arrangement of the membrane 41. It is understood that the metal heat sink structure 50 is at least thermally connected to the rest of the enclosure 10. Since the sealed container formed by the membrane 41 encloses the computer processor 30, full tamper-protection is achieved for the computer processor 30.

The tamper-protected enclosure 10 itself may be cooled in any efficient conventional way, depending on the circumstances. If such cooling is then applied to the exterior of the tamper-protected enclosure 10, the tamper-protection of the computer device 1 is not jeopardized by such cooling. For instance, further heat bridges, cooling fans and liquid cooling systems may be applied externally in relation to the enclosure 10, absorbing excess thermal energy transported from the computer processor 30 to an external surface of the enclosure 10.

As is illustrated in FIGS. 1-11, the hollow metal body 20, the membrane 41 and the metal heat sink structure 50 may be sandwiched together across an area covering at least 10%, more preferably at least 25%, most preferably at least 50%, or even at least 70%, of the total area of said inside surface 22 of the hollow metal body 20. This provides efficient heat transport from the metal heat sink structure 50 to the hollow metal body 20. The said sandwiched surface may be at least 0.02 m$^2$, or even at least 0.05 m$^2$.

In particular, the metal heat sink structure 50 may comprise a metal plate 51 the shape of which is at least partly, preferably completely, complementary to a part of the said inside surface 22 of the hollow metal body 20. The metal plate 51 may be of constant or substantially constant thickness and may comprise a flat part arranged to extend across a flat part of said inside surface 22, such as an inside floor (as shown in FIGS. 1-11), an inside ceiling or an inside side wall of the hollow metal body 20. As is illustrated in FIGS. 1-11, the metal plate 51 may further comprise one or several, such as at least two, or even four, side parts extending at a respective angle from the said flat part and each further being arranged to extend across a differently angled respective inner surface of the hollow metal body 20, such as across different side walls of the hollow metal body 20.

In particular, and as is shown in FIGS. 1-11, the metal plate 51 may have a trough shape, or at least substantially have a trough shape. The base of such a trough may be arranged to cover the entire inside floor or ceiling of the hollow metal body 20 and also of the enclosure 10.

In some embodiments, the metal heat sink structure 50 may comprise a metal protruding part 52, which is thermally connected to the metal plate 51. In particular, the metal protruding part 52 may be directly attached to the metal plate 51, or may comprise one single homogenous metal body which is shared with the metal plate 51. Further, the metal protruding part 52 may protrude out from an inside of the metal plate 51, and be arranged to be thermally connected to the computer processor 30 as described above. In particular, the metal protruding part 52 may form a tower structure arranged to support the computer processor 30 in its desired location within the enclosure 10 at a certain distance, such as at least 5 cm, from the metal plate 51. As is illustrated in FIGS. 1-11, the protruding part 52 may protrude in a generally inwards direction, towards a centrally located area of the enclosure 10.

In one embodiment, having the metal heat sink structure 50 be an enveloping metal box structure enables long product lifetimes and smooth interaction with the sensitive tamper membrane 41. For example, the metal heat sink structure 50 may be designed with smooth corners and/or edges, and well-mated surfaces that interact with the tamper membrane 41 appropriately, (i) for heat dissipation purposes and also (ii) so as to not damage the membrane over time when exposed to vibrations and general mechanical forces, e.g., in production, assembly, and deployment. The same principles may also be applied to all components of the enclosure, especially those that interact with the tamper membrane 41, and in particular to interior surfaces 22 of the hollow metal body 20. By the term "smooth corners" and, correspondingly, "smooth edges", is meant that there are no corners or other structures having a radius of curvature of less than 1 mm, preferably less than 2 mm, most preferably less than 5 mm, at which the membrane 41 is subjected to forced bending. For instance, the inside surface 22 of the hollow metal body 20 may have a shape which is complementary to the external metal heat sink structure 50 surface 53, forming the said sandwich construction in which the trough-shaped membrane 41 fits with a shape comprising no sharp corners or bends/edges.

Figure 12:
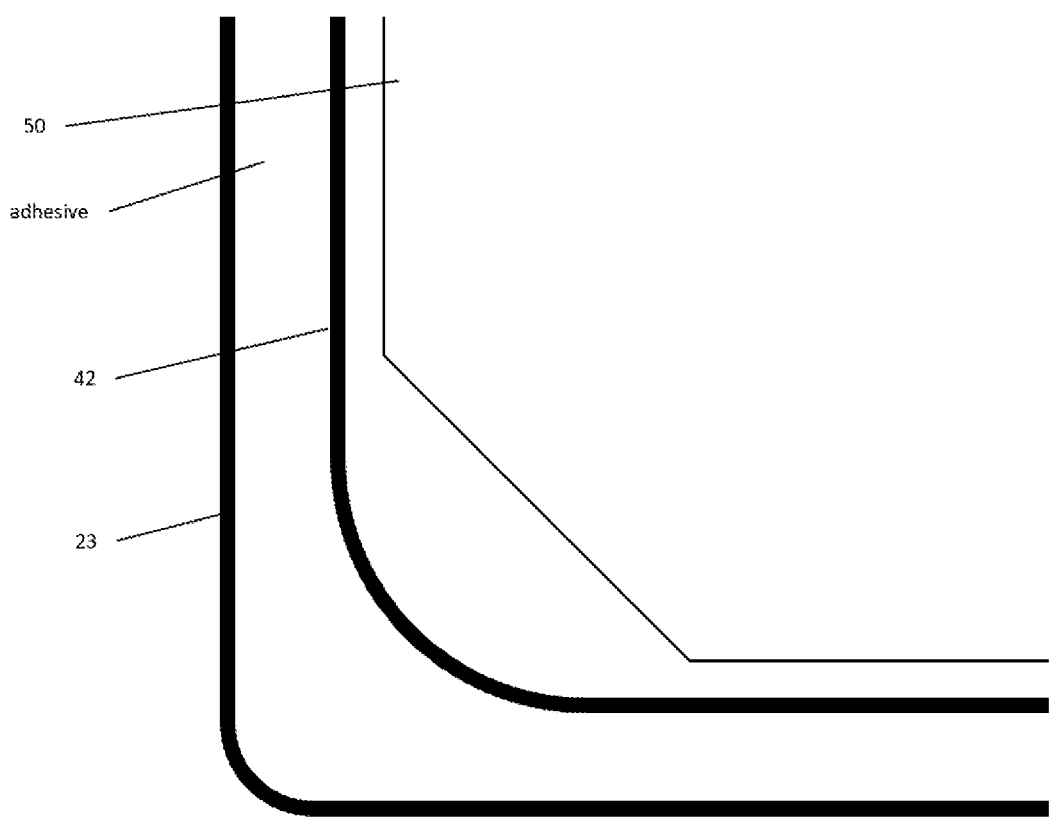
FIG. 12 is a schematic detail view of a tamper-proof computer device according to the invention.

FIG. 12 illustrates a corner of the metal heat sink structure 50 which has been cut-off at a location in which the membrane part 42 is bent at a cross-sectional corner of the enclosure part 23, leaving some room for the membrane part 42 to have a larger radius of curvature at the cross-sectional corner in question then what is the case for the enclosure part 23 against which the membrane part 42 is pressed. This is particularly advantageous during production and using a rubber press to put the membrane in place, as described below. It is realized that FIG. 12 shows the metal heat sink 50 having a cross-sectional shape with non-smooth edges. However, this embodiment may advantageously be combined with smooth-edged metal heat sinks 50 as described above.

Also, a design of the metal heat structure 50 as an enveloping metal box arranged to surround the CPU 30 and possibly also other tamper-protected circuitry in the enclosure 10 allows it to prevent inner circuitry, wires and other components from getting into contact with the tamper membrane 41 electrically or mechanically and damage it.

Moreover, to properly position and fasten the heat sink structure 50 with respect to the tamper membrane 41 and the rest of the enclosure 10, heat-expanding epoxy foam (FM 490A) and/or elastic thermal pads (e.g., Fuji-Poly_PG25A-00-200GY) may judiciously be placed internally.

For example, thermal pads with elastic properties may be placed internally at various places, e.g., between the heat sink structure 50 and the enclosing membrane 41, to provide a constant level of elastic compression internally, to ensure good thermal transfer towards the external surfaces of the enclosure 10, to stabilize and affix any inner components with respect to the enclosure 10, and to absorb vibrations and other mechanical forces that may occur in deployment.

Elastic thermal pads (e.g., Fuji-Poly PG25A-00-200GY) of properly chosen thicknesses (e.g., between 1 mm and 3 mm) can be arranged at select locations to provide desired compression forces sufficient to maintain appropriate contact between the heat sink structure 50 and the enclosing membrane 41.

Further, heat-expanding foam may also be placed at various places internally, e.g., between the heat sink structure 50 and the enclosing membrane 41, in such a way as to allow a baking process to expand the foam and exert a certain pressure, which may favourably interact with the elastic thermal pads to achieve or amplify the thermal pad properties, e.g., stabilization, vibration absorption, and thermal dissipation.

Heat-expanding foam between the heat sink structure 50 and the enclosing membrane 41 is compatible with the deployment of a gas-filled enclosure. For example, the heat sink structure 50 may be sealed and gas-filled, while such foam is arranged between the membrane 41 and the heat sink structure 50.

To provide efficient heat transfer, at least part of the metal heat sink structure 50, preferably the whole metal heat sink structure 50 including any metal plate 51 and protruding part 52, may be made from copper. The hollow metal body 20, and possibly the entire enclosure 10, may be made from stainless steel or aluminium. In addition to the hollow metal body 20, the enclosure 10 may also comprise other parts, such as an external cover 27 arranged to cover the tamper-protection circuitry 46, and protect it from dust etc.

The tamper-detection sensor 40 may comprise, apart from the tamper-detecting membrane 41, a variety of different individual tamper-detecting sensors 40a, such as temperature sensors, vibration sensors, electrical sensors, voltage sensors, and so forth. All such individual tamper-detection sensors may be connected to one and the same control device, as will be described in further detail below.

The membrane 41 may be manufactured from any suitable material, being sufficiently thin so as not to significantly prevent thermal transfer from the metal heat sink structure 50 to the material of the hollow metal body 20. For instance, the membrane 41 may be made from multiple layers of mylar, polyester, dielectric material, deposited silver traces, and/or adhesive 60 (see FIG. 5), with a total thickness maximally 0.1 mm or even maximally 0.2 mm, or even maximally 0.25 mm, or even maximally 0.5 mm.

The tamper-detecting membrane 41 may be or comprise a multi-layer printed circuit on mylar support layers, with thin traces of metal deposits, such as silver, of horizontal widths of at most 0.1 mm or even at most 0.2 mm, or even maximally 0.25 mm, or even maximally 0.5 mm.

The tamper-detecting membrane 41 may comprise multiple, separate electrical traces of the said type laid out on separate layers as well as traces traversing across and interconnecting the traces within different layers.

One of the purposes of the multiple layers of printed electrical traces is to create a set of actively controlled electric circuits that prevent an attacker from penetrating through the membrane without being detected by anti-tamper circuitry 32, 46 connected to the membrane 41. To this end, the internally arranged anti-tamper circuitry 32 may inject electrical signals into the membrane traces and measure any signal degradation or change over time. Penetration attempts may distort the signal or change readings etc.

For example, a signal may be injected at one end of a trace and certain characteristics thereof (signal distortion, phase shifts etc.) may be measured upon its return at the other end. Further different electrical properties of certain traces or between different traces can also be measured, such as electrical impedance, resistance, inductance, etc.

In some embodiments, the enclosure 10 comprises two enclosure parts 23 and 24, arranged to be fastened together, and together forming (in a fastened together state) said hollow metal body 20, and hence forming at least part of the sealed enclosure 10. Furthermore, the tamper-detection sensor 40 may comprise two tamper-detecting membrane parts 42, 43, each corresponding to a respective one of said enclosure parts 23, 24 and each covering a respective inside surface 22 of the enclosure part 23, 24 in question. Each membrane part 42, 43 may be arranged to cover the complete inner respective surface 22 of the corresponding enclosure part 23, 24, so that the above discussed sealed container is formed; so that the enclosure parts 23, 24 together define the hollow metal body 20; and so that the membrane parts 42, 43 and the enclosure parts 23, 24 share one and the same joint line. Rather than only two enclosure parts 23, 24 matched with only two corresponding membrane parts 42, 43, there may be three or more of each. However, advantageously respective joint lines of the enclosure and membrane parts are the same for enclosure parts and membrane parts, so that each enclosure part 23, 24 can be paired with a respective membrane part 42, 43 before being joined together so as to form the hollow metal body 20 with the sealed container also forming as a result.

In particular, membrane parts 42, 43 may be arranged to be pressed between the enclosure parts 23, 24 when the enclosure parts 23, 24 are joined together, hence forming the said sealed container. More specifically, a respective peripheral edge part of each membrane part 42, 43 may be arranged to be pressed between a corresponding pair of peripheral edge parts of the enclosure parts 23, 24. An example of such a construction is illustrated in FIGS. 1-11 and is discussed in further detail below.

In some embodiments, the tamper-detecting membrane 41 is connected to the internal tamper-protection circuitry 32, arranged internally to the sealed enclosure 10. Such internally arranged tamper-protection circuitry 32 is arranged to be in electric contact with the membrane 41; to detect a tampering attempt by reading a corresponding electric signal from the membrane 41; and to set off an appropriate tamper reaction as a result, e.g., zeroization of internal information and the physical support thereof (e.g., DRAM memories), power-off of selected circuitry (e.g., the circuit board 31, which may be a motherboard, CPU 30), and/or to send a tamper signal to an external entity. The internal tamper-protection circuitry 32 may be powered by a battery 47 arranged externally to the sealed enclosure 10. Since such internal tamper-protection circuitry 32 is internal to the sealed enclosure 10 (arranged within the enclosure 10, such as inside the hollow interior 21 of the metal body 20), it may be protected by the overall enclosure anti tamper mechanisms, including the tamper membrane itself.

In some embodiments, in the tamper-detection sensor 40, the tamper-detecting membrane 41 is connected to tamper-protection circuitry 46 at least part of which is arranged externally to the sealed enclosure 10. Such externally arranged tamper-protection circuitry 46 is arranged to be in electric contact with the membrane 41; to detect a tampering attempt by reading a corresponding electric signal from the membrane 41; and to set off an alarm as a result. The tamper-protection circuitry 46 may be powered by the battery 47, which is arranged externally to the sealed enclosure 10. Since such tamper-protection circuitry 46 may have its own tamper-detection mechanism (such as detecting a removal of the battery 47 or any other tampering attempt), it is advantageous to arrange it externally to the enclosure 10, so that heat produced as a result of the operation of the tamper-protection circuitry 46 can be efficiently cooled off without adding to excess heat inside of the enclosure 10. Using a construction according to the present invention, full membrane 41 integrity can be guaranteed while still being able to arrange the external tamper-protection circuitry 46 externally to the enclosure 10. It is realized that one or both of the internal 32 and external 46 tamper-detecting circuitry may be used, depending on the detailed prerequisites.

In particular, the said membrane 41 integrity is made possible by the said at least two enclosure parts 23, 24 being joined together in such as way as to ensure any later penetration or separation attempts will result in detectable tampering of the tamper membrane 41.

For example, the tamper-detecting membrane parts 42, 43 may be joined together using an adhesive providing an adhesive joint 45 the strength of which is at least as strong as the membrane itself 41, so that the membrane 41 itself will rupture before the joint 45 is broken during a tampering attempt, setting off an alarm as described above. The adhesive may be applied along the entire flange 23a, 24a in question (see below), binding together the first 42 and second 43 membrane parts forming a membrane joint 45 along the entire contact line 25a. This will be described and exemplified further in the following.

Hence, this can be achieved using a strong heat-cured adhesive 60 to create one or several bonds of the said type between key components of the two enclosure parts 23 and 24, and the tamper-detecting membrane parts 42, 43. Specifically:

A bond between exposed metal parts of the two enclosure parts 23, 24, such as the respective flat part 23a, 24a of the respective flange 23a, 24, as described below.

A bond between the part 43a of the membrane part 43 that covers the flange 24a and the part 42a of the membrane part 42 that covers the flange 23a in the mounted state of the enclosure 10.

One or both membrane parts 42, 43 may be also bonded to its corresponding enclosure part 23, 24 using an adhesive applied between the enclosure part 23, 24 in question and the membrane part 42, 43 in question, both in the respective flange 23a, 24a region, as well as in the rest of the parts (e.g., in the central parts of the membrane parts mated with their corresponding enclosure parts).

In particular, the adhesive used may be a heat-reactive adhesive (e.g., structural adhesive film AF 163-2), in which case the computer device 1 may have been sealed, during manufacturing, using a sealing method comprising a curing step, such as a heating step (see below), curing the adhesive forming said joint 45. It is noted that this results in a permanently sealed membrane 41 inside the hollow metal body 20, so that the computer processor 30 cannot be reached without breaking the membrane 41 and as a result setting off an alarm.

Suitable adhesives include AF 163-2, Henkel EA 9696 and other high-strength structural adhesives. For some such adhesives, proper curing may involve a heating step which may comprise heating the assembled hollow metal body 20, with the membrane 41 and the computer processor 30 mounted therein, to a temperature of at least 50 and up to 120° C. during a time period of at least 30-180 minutes, depending on the desired adhesion strength and the temperature tolerances of the internal circuitry and components. The heat-curing may also take place under a pressure (pressing the enclosure parts 23, 24 and hence the flange 23a, 24a and membrane parts 42, 43 joint, together) of at least 5 psi, such as between 5 and 10 psi.

In certain embodiments, adhesives requiring one or multiple stages of different types of curing are used. For example, chemical curing, involving the application of special curing chemicals, or electrical curing, involving the application of electrical current, etc. It is understood that in these embodiments, the "heat curing" discussed in this application, is replaced by a respective curing method or methods applied in a predetermined sequence.

Hence, the membrane 41 may be joined together, for instance using such an adhesive as described above, along join lines following respective peripheral edges of each membrane part 42, 43 so as to form the sealed container. Along such join lines the membrane parts 42, 43 may also be permanently fastened to the corresponding enclosure parts 23, 24, such as using said adhesive.

However, the membrane 41 may be arranged not to be fixedly fastened to the enclosure 10 using any adhesive, apart from along said peripheral joint, and in particular to run freely between the metal heat sink structure 50 and said hollow metal body 20, but to be held in place by said sandwich arrangement. As detailed above, in practise, the membrane 41 may be held firmly in place by friction due to press action between the metal heat sink structure 50 and the hollow metal body 20, and in some embodiments together with judiciously placed heat-expanding foam and elastic thermal pads of the above described type. This provides a simple yet effective design.

As to the said peripheral joint, the tamper-detecting membrane 41 may be pressed between the two enclosure parts 23, 24, and in particular between a respective cooperating flange 23a, 24a of each enclosure part 23, 24, forming a flanged pressing aggregate preferably extending uninterrupted along a complete or substantially complete closed periphery of the enclosure 10. Fastening means 25 may penetrate said flanged pressing aggregate and hold the flanged pressing aggregate together.

In particular, the flanged pressing aggregate may be arranged with a hollow space 25b (hollow before mounting of membrane parts 42, 43, but at least partly occupied by membrane parts 42, 43 after mounting, possibly with an innermost part 25c of the hollow space 25b being filled only by adhesive when mounted), provided by a respective indentation 23c, 24c of at least one of the respective flanges 23a, 24a of said enclosure parts 23, 24, which hollow space 25b is then arranged to receive and accommodate the tamper-detecting membrane 41, advantageously a respective edge part of each one of said first and second membrane parts 42, 43, being arranged on top of each other along a longitudinal direction (along the peripheral joint 45) of the hollow space 25b as illustrated in FIGS. 1-11.

The said flanged pressing aggregate may further be arranged so that the said enclosure parts 23, 24 are directly attached one to the other, using an adhesive of the above type or a different type, along a contact line 25a extending uninterrupted along a complete or substantially complete closed periphery of the enclosure 10, peripherally externally to a periphery of the membrane 41. The "direct attachment" between the enclosure parts 23, 24 is hence a direct attachment in the sense that the adhesive, but no other material, is arranged between the enclosure parts 23, 24, and in particular that the membrane 41 is not arranged between the enclosure parts 23, 24, along said contact line 25a. It is noted that the contact line 25a is arranged exteriorly to the periphery of the membrane parts 42, 43 along said peripheral joint 45, and that the edge parts of the membrane parts 42, 43 are pressed together by a different part of the enclosure parts 23, 24 arranged interiorly to said contact line 25a.

Moreover, the said flanges 23a, 24a may each comprise a respective flat part 23b, 24b, arranged to abut flatly against a corresponding flat part 23b, 24b of an adjacent enclosure part 23, 24 flange 23a, 24a, hence forming a direct attachment surface of said direct attachment of the above defined type.

Such a joint provides for a very secure and robust, yet simple and easily assembled construction.

In one embodiment, the tamper protection relies mainly on the membrane 41 and the fact that the structural adhesive film from which the membrane 41 is made is very difficult to remove chemically or physically without destroying or affecting the membrane 41. Further, the enclosure 10 may be designed so the structural integrity of the enclosure 10 relies mainly on the bond along the direct contact line 25a between the flat parts 23b, 24b (the parts of the flanges 23a, 24a that are not covered by a membrane part 42, 43). This direct metal to metal bond can be made very strong and ensures that physically it is very difficult to separate the two halves 23, 24.

This is in contrast with a design in which only the parts of the flanges 23a, 24 that are covered by the membrane parts 42a and 43a (hence not resulting in a direct metal to metal joint) were to be bonded. In that case, the weakest link in the sandwich would have been the membrane 41. And the membrane 41 is usually designed to be fragile and break easily, to detect tampering. Hence, using the invention the structural integrity of the entire enclosure 10 can be guaranteed even when using a membrane 41 completely enclosing the tamper-protected circuitry, which membrane 41 may be so easily broken so that is may for instance not provide sufficient strength to withhold forces developed during normal use of the computer device 1, such as when lifting the computer device 1.

The said direct metal to metal joint between the enclosure parts 23, 24 also serves a purpose in embodiments where the entire module 10 sandwich is heat-cured while being pressured together at 5-10 psi, to ensure curing of the adhesive. After curing, once this pressure is lifted however, the internal elastic heat-pads may generate a pressure that tends to push the two halves 23, 24 apart and counter the adhesive bond, and thus break the membrane 41—in case the membrane 41 forms the weak link between the enclosure parts 23, 24.

A design with a strong direct metal-to-metal bond (between 23*b* and 24*b*) resolves this problem since that bond can resist such internal pressure and provide structural integrity to the entire enclosure 10.

In some embodiment, the adhesive is chemically able to penetrate the membrane and construct a single adhesion structure also between the membrane-covered parts 42*a*, 43*a*. After curing, this structure may be strong enough to provide structural integrity to the enclosure and not require direct metal-to-metal bonds such as between parts 23*b* and 24*b*.

In some embodiment, the structural integrity is further improved by fastening means 25 holding the two enclosure parts 23 and 24 together. Such fastening means 25 may be arranged along the complete periphery of the enclosure 10, such as substantially equidistantly located along the contact line 25*a*.

Further, membrane parts 43 and 44 may aligned so as to make electrical contact, e.g., through their sub-parts 42*a* and 43*a* in flange 23*a*, 24*a* areas. More specifically, such alignment can be made by aligning corresponding metal threads (of the above described type) integrated in the membrane parts 42, 43. Attempts at penetrating or separating the enclosure parts 23 and 24 will result in electrical changes in the membrane 41 that can be detected by the tamper detection circuitry.

In some embodiments, the interior of the hollow metal body 20 may be filled with a solid material, such as epoxy or similar. However, advantageously, the interior of the hollow metal body 20 comprises a gas, such as air or an inert gas, such as nitrogen or carbon dioxide. Another advantage of a gas filling is the possibility of ulterior repair, reuse or inspection of some of the circuitry and other inner parts. In order to reseal the computer device 1, the membrane 41 may have to be replaced, but the tamper-protected components within the membrane 41 may be accessed without breaking them. It is noted that at least one of the sealed membrane 41 enclosure and the hollow metal body 20, possibly both of these structures, may be sealed to be gas tight. Preferably, the interior of the hollow metal body 20 is completely filled with such a gas, apart from the volume occupied by the tamper-protected computer parts, such as the computer processor 30, arranged inside the enclosure 10. In some embodiments, a completely filling epoxy may be used instead of the gas.

The tamper-protected computer device 1 according to this invention is, for instance, useful as the tamper-protected module 80 of the general type described in WO 2016/137573 A1 and denoted "ENFORCER blade" therein. In WO 2016/137573 A1, replacement of internal components, e.g., in the process of repair, may be achieved by communicating an electronic message called a REPLACE_COMPONENT message to the enclosure in question. In a preferred embodiment, such communication is initiated by an external party, such as a certifying party. In response, the enclosure may destroy all internal sensitive information and deactivate tamper-detection. If the structural design allows separation of the enclosure parts 23 and 24 without physical destruction, the enclosure may be then opened for access to its internal components.

Being able to allow the interior of the enclosure 10 to be gas-filled makes the construction less expensive. However, an advantage is also to increase convective heat transfer from tamper-protected computer parts inside the enclosure 10 to the hollow metal body 20 and as a result to the outside surface of the enclosure for further transport away from the computer device 1 using conventional cooling as described above.

To increase the efficiency of heat transport away from the heat-producing elements, the inside of the sealed enclosure 10 may comprise surface-increasing internal structure elements 26*b*, such as a rib pattern. The internal structure elements 26*b* may form an integrated part of the heat sink structure 50, as is illustrated in for instance FIG. 7.

Furthermore, the computer device 1 may further comprise a fan 60 (schematically indicated in FIG. 4), arranged inside the hollow metal body 20 and arranged to provide such gas convection inside the hollow metal body 20. Hence, such a fan 60 may be arranged only to give rise to a circulating gas flow within the hollow metal body 20 itself, and in particular strictly within the sealed container.

In order to increase the efficiency of heat transport away from the computer device 1, the outside of the sealed enclosure 10 may comprise surface-increasing external structure elements 26, such as a rib pattern.

The external parts of the enclosure parts 23, 24 may be designed with reinforcement elements 24*g*, such as reinforcement flanges, in place to avoid warping during the membrane 41 installation process involving adhesive and an initial baking step, as well as during subsequent baking and curing processes when the enclosure parts 23, 24 are bonded together. A simple metal box with only a lip (such as formed by flanges 23*a*, 24*a*) for reinforcement would run the risk of warping. Hence, such reinforcement flanges constitute, in addition to the flanges 23*a*, 24*a*, metal pieces on the sides of the enclosure 10 and arranged along the contact line 25*a*, reinforcing the flange 23*a*, 24*a* lip and its link to the rest of the enclosure 10.

Specifically, a number of reinforcing flanges 24*g* may be included in the design of at least one of the enclosure parts 24 to prevent warping during membrane 41 installation or during the process of adhesion and heat-curing with part 23. In their absence, such an enclosure part 24 may warp and alter its alignment to a joining enclosure part 23 and thus compromise any resulting bond.

As is illustrated in the Figures, the reinforcement flanges 24*g* may be formed as integrated metal protrusions partly defining the external shape of the enclosure 10. Specifically, the reinforcement flanges 24*g* may run from the respective flange 23*a*, 24*a* and away from the contact line 25*a*, such as substantially perpendicular to the flat parts 23*b*, 24*b* and along the enclosure 10 wall, either a certain distance or the whole way to an upper or lower side of the enclosure 10.

Manufacturing a Tamper-Proof Computer Device

Figure 13:
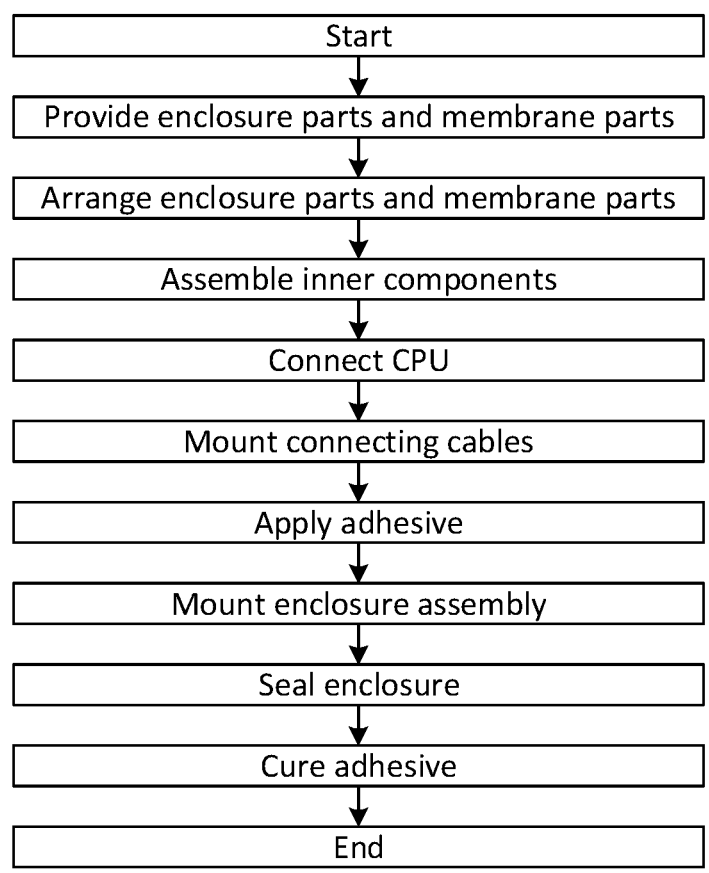
FIG. 13 is a flowchart illustrating a manufacturing method according to the present invention.

FIG. 13 illustrates a method according to the invention, for manufacturing a tamper-proof computer device 1 of the type described above.

In a first step, the method starts.

In a subsequent parts provision step, the said at least two first 23 and second 24 enclosure parts are provided.

Enclosure parts may be manufactured from different materials (e.g., aluminium, AL6061, copper, iron) using different technologies (e.g., CNC machining, 3D printing, die casting, etc.). Further, they may be anodized fully, or only in part, to prevent internal short-circuiting with parts of the tamper membrane or other electrical parts. They may also be machined internally so as to provide a smooth internal surface 22 not risking damaging the membrane 41.

In the said parts provision step, the said at least two first 42 and second 43 tamper-detecting membrane parts are provided.

The tamper-detecting membrane parts 42,43 may be manufactured through different processes, e.g., by assembling multiple layers of flexible conductive and non-conductive materials, as described above. A typical membrane part 42, 43 may have 5-10 layers, comprising 2-5 electrical circuit layers.

The parts provision step may also comprise providing the other parts comprised in the computer device 1 as described herein.

In a subsequent parts arrangement step, the first membrane part 42 in question is arranged so that it covers an inside surface of the first enclosure part 23 in question, as has been described above. Similarly, the second membrane part 43 is arranged so that it covers an inside surface of the second enclosure part 24. The arrangement may involve the use of adhesives between parts 42 and 23; between parts 43 and 24; between parts 42 and 43; and/or between parts 23, 24, as has been described above. To this end, a special fixture may be designed to hold enclosure parts 23,24 while the corresponding membrane parts 42 and 43 are gradually pushed in place, e.g., using a gradually expanding rubber press.

In a subsequent inner components assembly step, the inner components are provided, including the tamper-protected circuitry and the internal anti-tamper control circuit 32, and in particular the circuit board 31 and the CPU 30, and any used cables. Multi-trace flat flexible electric ribbons 55 may be installed to connect the internal tamper-protecting control circuit 32 to the circuit board 31; and cables and multi-trace flat flexible electric ribbons 56 may be installed to connect the internal tamper-protecting control circuitry 32 to the membrane parts 42, 43 and any other used anti-tamper sensors 40a.

In certain embodiments, the tamper-protecting control circuit board 32 may be connected to the circuit board 31 wirelessly. For example, a standard Bluetooth, or 802.11 wireless protocol may be used for said connection. Such wireless connection may eliminate the need for additional wired conduits and may decrease overall complexity and ease of assembly.

CPU connection step, the CPU 30 may be connected to the circuit board 31 and the circuit board 31 may be connected to the metal protruding part 52 of the heat sink structure 50.

Optionally, in a subsequent connecting cabling mounting step, the inner anti-tamper control circuit 32 is connected to the outer tamper-protection circuit 46 using one or more thin multi-trace flat flexible electric ribbons 57 designed to be thin enough to traverse from the inside to the outside between the membrane parts 42, 43, through the joint between the metal heat sink parts 23, 24. This step may be performed also later in the process.

To this end, the flanges 23a, 24a may be designed with a cooperating respectively slightly indented region, extending through the enclosure 10 wall and forming a through channel through said wall in the mounted state of the enclosure 10, to allow a smooth transition of the flat flexible ribbon 55 between the adhesive, the membrane parts 42a and 43a, and the exposed metal sections 23b and 24b, of the enclosure parts 23 and 24. The through channel hence accommodates the cabling 57 connecting the interior and the exterior of the membrane 41, and is filled by adhesive so as to provide a completely sealed membrane 41 through which said cabling 57 runs.

In a subsequent enclosure 10 assembly mounting step, the inner anti-tamper control circuit 32 may be connected to the tamper membrane parts 42 and 43 and other anti-tamper sensors 40 using multi-trace flat flexible electric ribbons 56.

Figure 4:
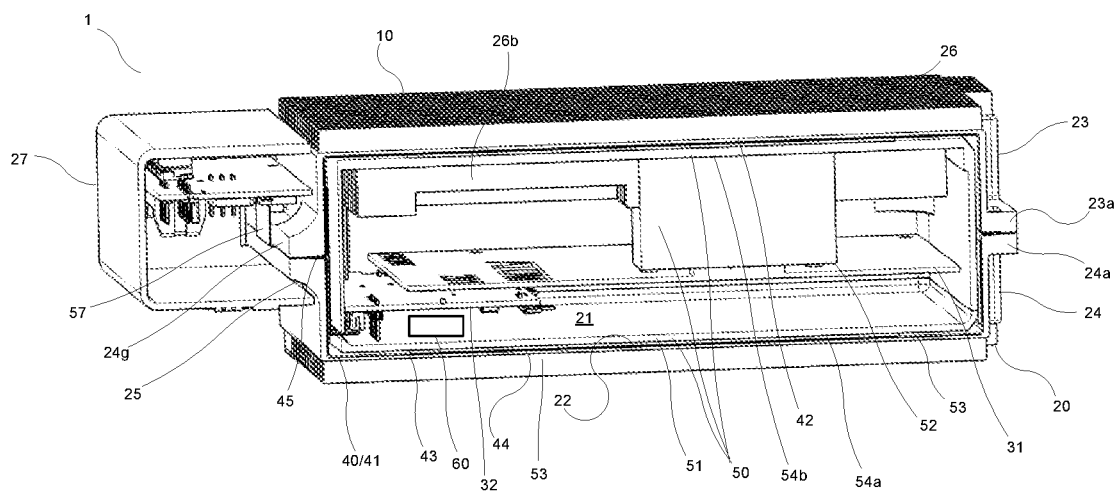
FIG. 4 is a first perspective section view of the tamper-proof computer device illustrated in FIGS. 1 and 2, but with a tamper-protection circuitry removed for increased clarity.
Figure 5:
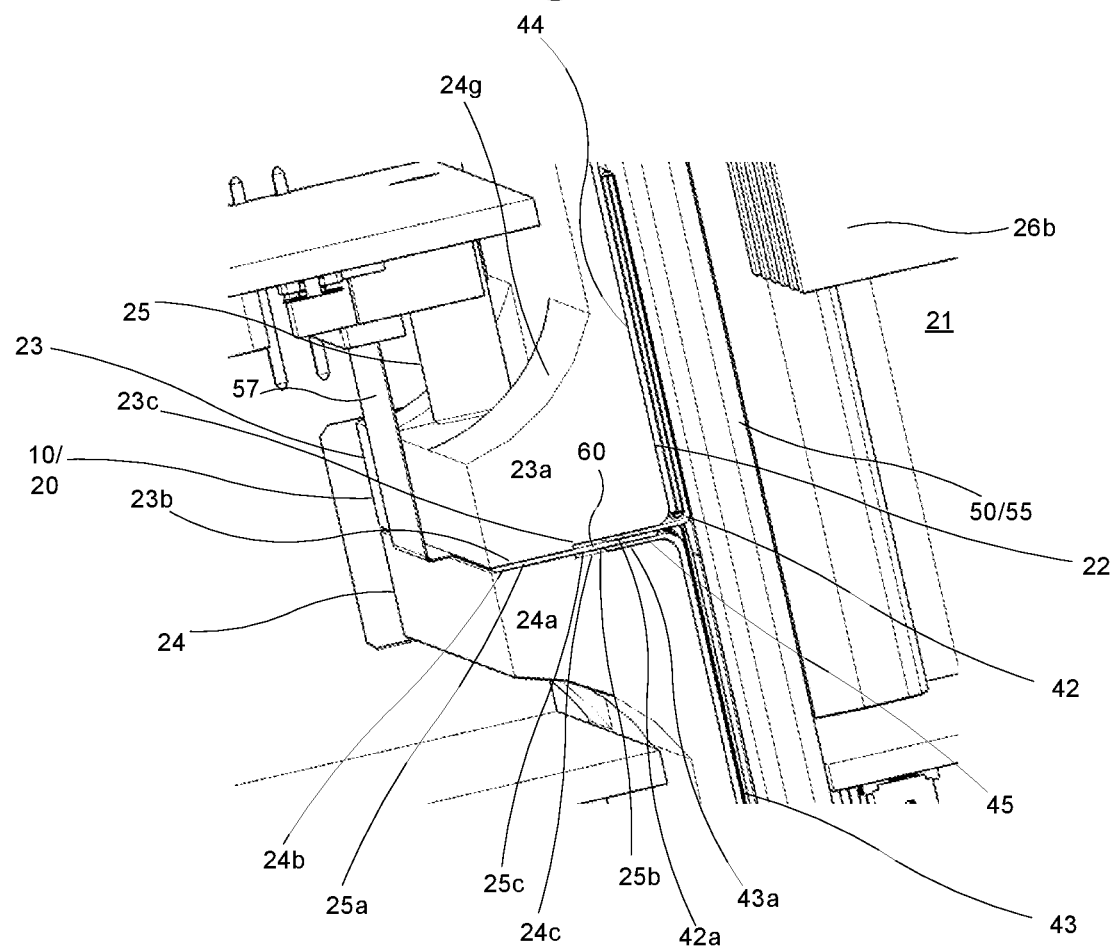
FIG. 5 is a detail perspective view of the device illustrated in FIG. 4.
Figure 6:
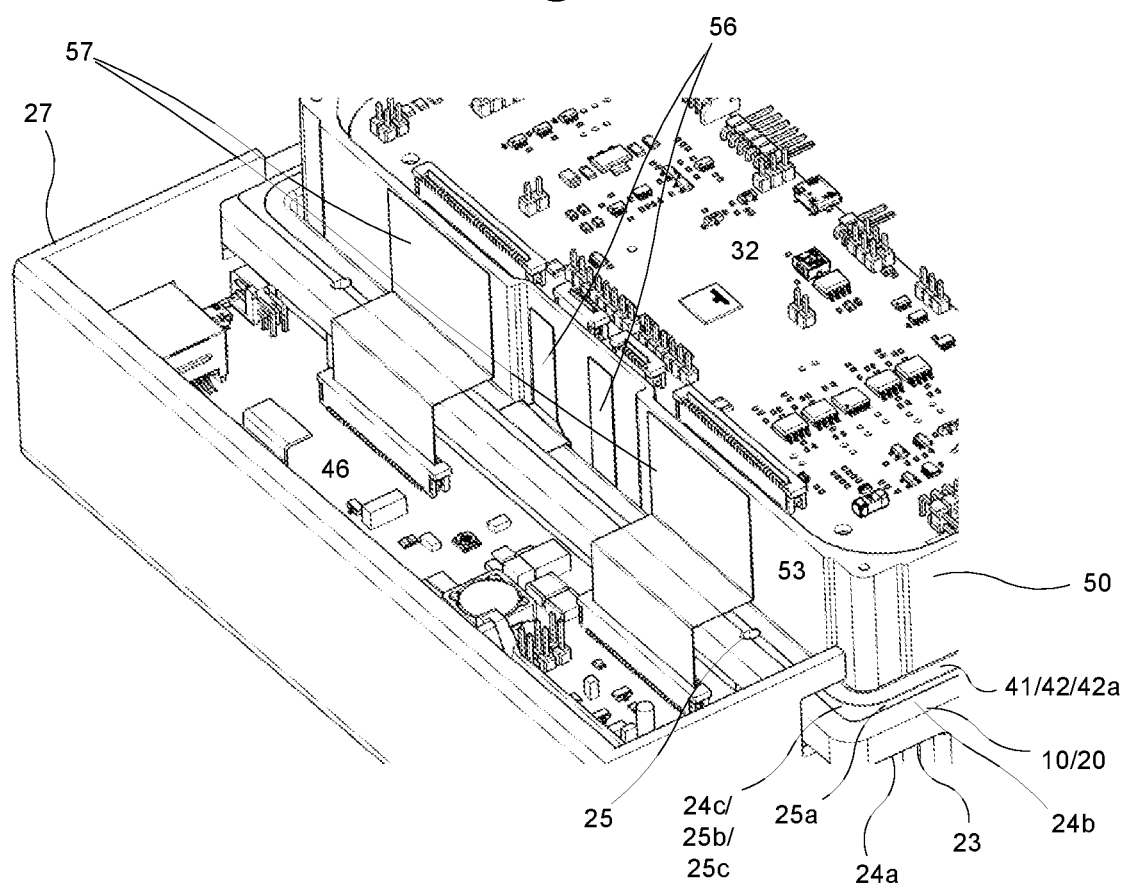
FIG. 6 is a detail perspective section view of the device illustrated in FIGS. 1 and 2.
Figure 7:
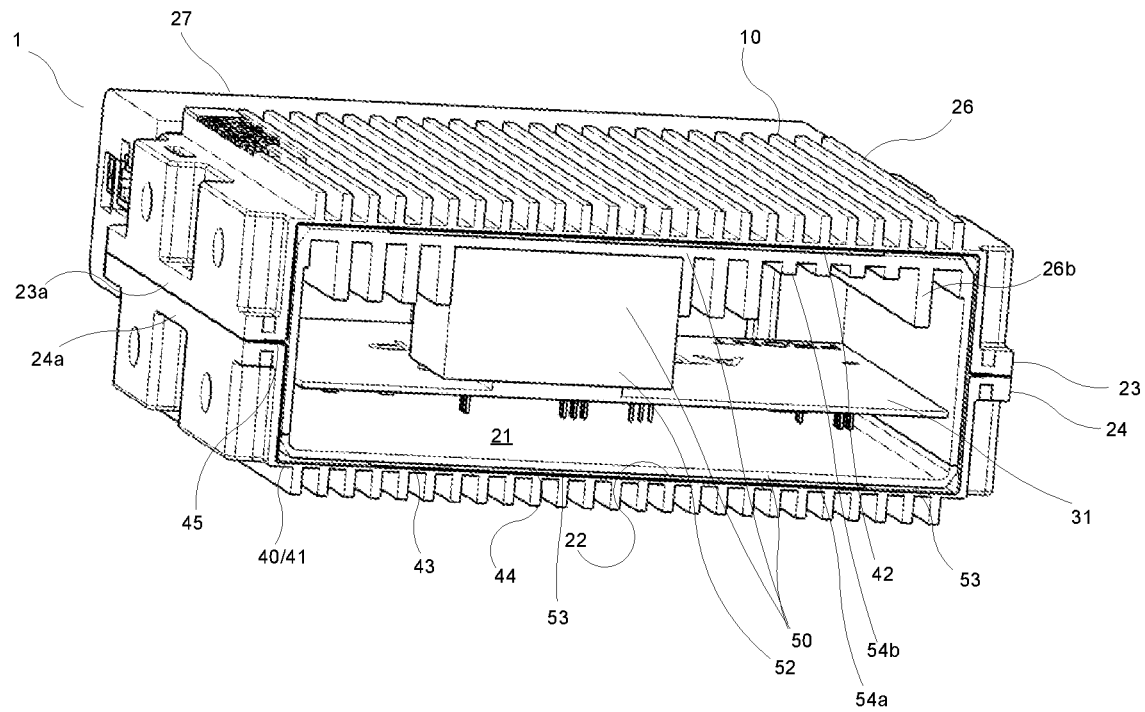
FIG. 7 is a second perspective section view of the tamper-proof computer device illustrated in FIGS. 1 and 2.
Figure 8:
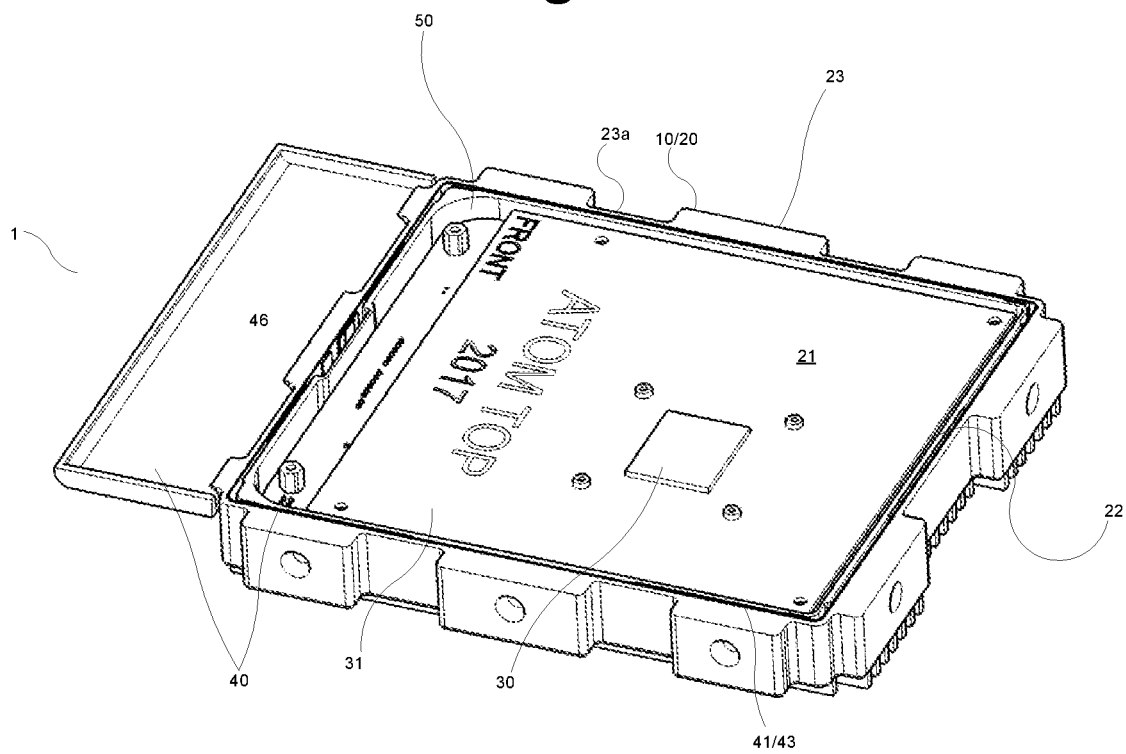
FIG. 8 is a third perspective section view of the tamper-proof computer device illustrated in FIGS. 1 and 2, with said external circuitry cover removed.
Figure 9:
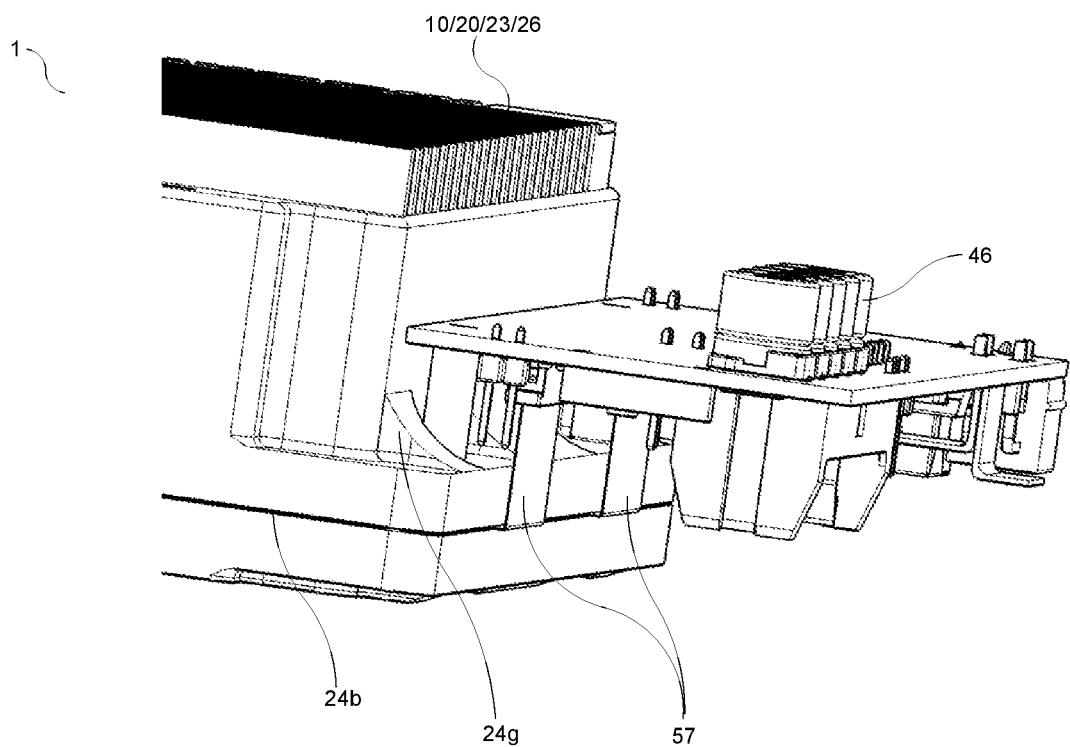
FIG. 9 is a detail perspective view of the section illustrated in FIG. 8.
Figure 10:
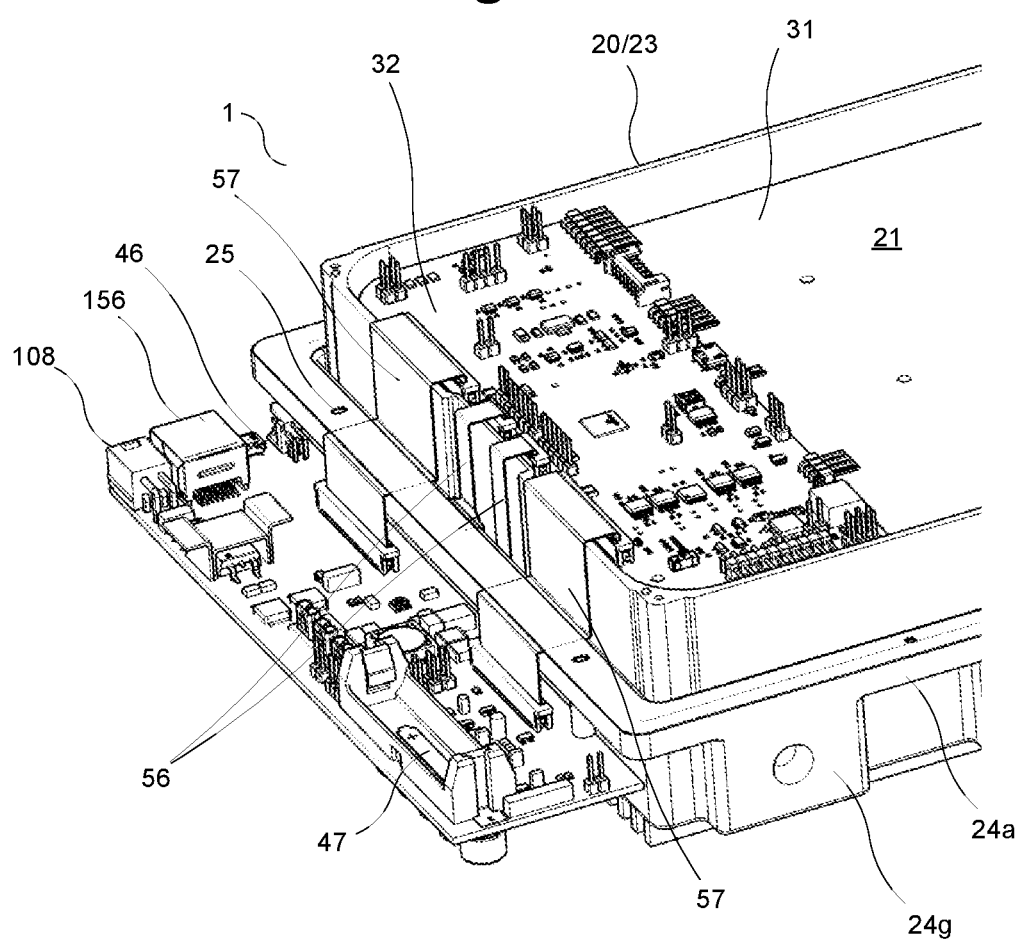
FIG. 10 is a fourth perspective section view of the tamper-proof computer device illustrated in FIGS. 1 and 2, also with the external circuitry cover removed.
Figure 11:
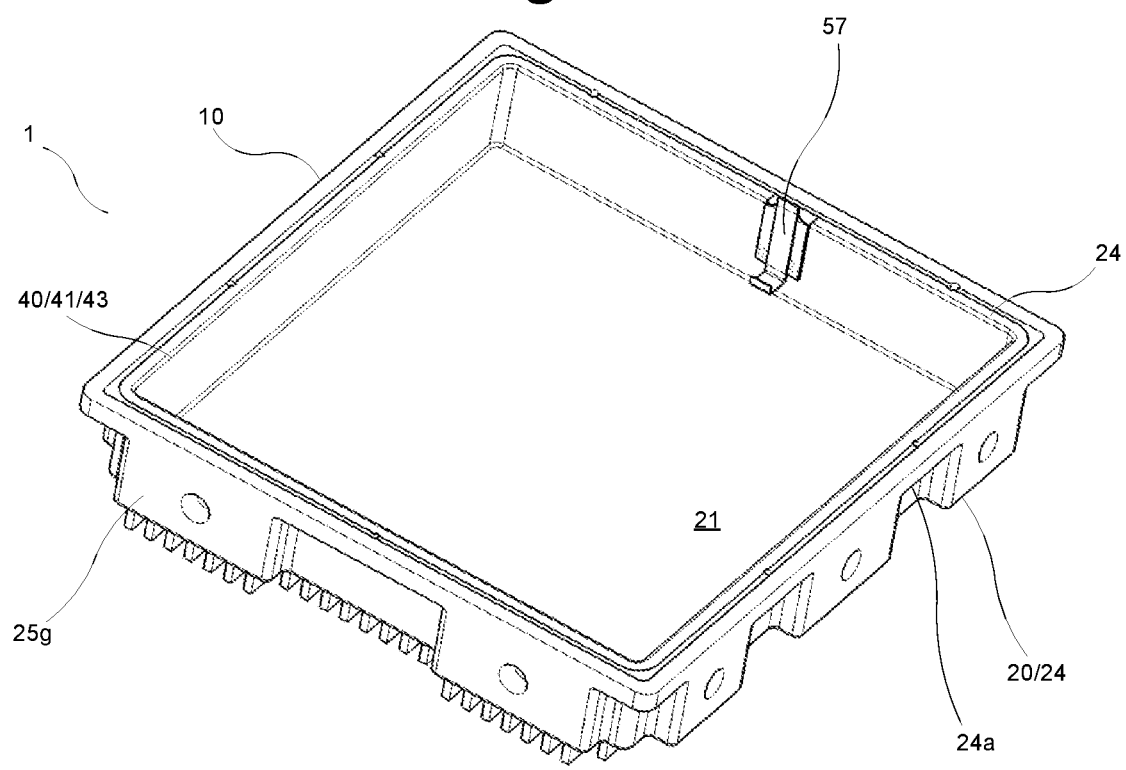
FIG. 11 is a fifth perspective section view of the tamper-proof computer device illustrated in FIGS. 1 and 2, with a top part removed.

In an embodiment, the next assembly mounting step comprises placing a top cover 54b on a bottom part 54a of the heatsink assembly 50 and screwing the top cover 54b tight to create a cohesive compact box. This is best illustrated in FIG. 4, where the reference numeral 50 points to three different parts of the heatsink assembly 50. The topmost one is the said top cover, forming the top of a substantially closed box, which in fact is the above discussed trough-shaped structure with said top cover forming the closed box.

In connection to mounting the heat sink structure 50, any used elastic thermal pads (such as FujiPoly_PG25A-00-200GY) may also be arranged on the external surface 53 of the heatsink assembly 50, or on its opposite internal surface (e.g., on top of the location of the CPU 30), to ensure better heat transfer between the heat sink structure and any components, including the membrane 41, that the heat sink structure should be in a direct thermal contact (as defined above) with.

Furthermore, stripes of heat-expanding foam epoxy foam may be arranged at key points between the hollow metal body 20 and the metal heatsink structure 50, e.g., around the connection area where the membrane parts 42 and 43 connect and mate with their corresponding flat flexible ribbons 56 so as to ensure the sensitive ribbon 56 to membrane parts 42, 43 connection area does not get in contact with the heatsink structure 50. As discussed above, during curing, the judiciously placed expanding epoxy foam, expands and pushes the heatsink structure 50 in place, against elastic thermal pads placed elsewhere between the heatsink structure 50 and the membrane parts 42 and 43, and away from the ribbon-membrane connection area.

In a subsequent adhesive application step, adhesive may be placed on the respective flange 23a, 24a of at least one of the enclosure parts 23, 24 to cover the entire flange 23a, 24a in question, including the part of the lip covered by the corresponding membrane part 42a, 43a and the part of the lip which is just exposed metal, as described above.

In a subsequent enclosure 10 assembly mounting step, the first 23 and second 24 enclosure parts are brought together, so that they together form said closed and hollow metal body 20, having the said inside surface 22 which is covered by said first 42 and second 43 membrane parts. As described above, the membrane parts 42, 43 in this instance form said sealed container, possibly together with additional membrane parts with corresponding additional enclosure parts as described above.

As described above, the hollow metal body 20 encloses said computer processor 30, and the first 42 and second 43 membrane parts may be pressed together between said first 23 and second 24 enclosure parts along a closed periphery along the hollow metal body 20, to form said hollow metal body 20 accommodating the formed sealed container, in turn enclosing the computer processor 30.

In a subsequent enclosure 10 sealing step, the hollow metal body 20 is permanently sealed using said adhesive applied along said closed periphery, in the manner described above, whereby an adhesive joint is arranged along said closed periphery.

In a subsequent adhesive curing step, as discussed above, weight (5-50 kgs) is placed on the assembled enclosure 10 to provide 5-10 PSI pressure for adhesive curing.

The assembly 10 is baked at 50-120° C. for 0.5-3 hours.

Figure 14:
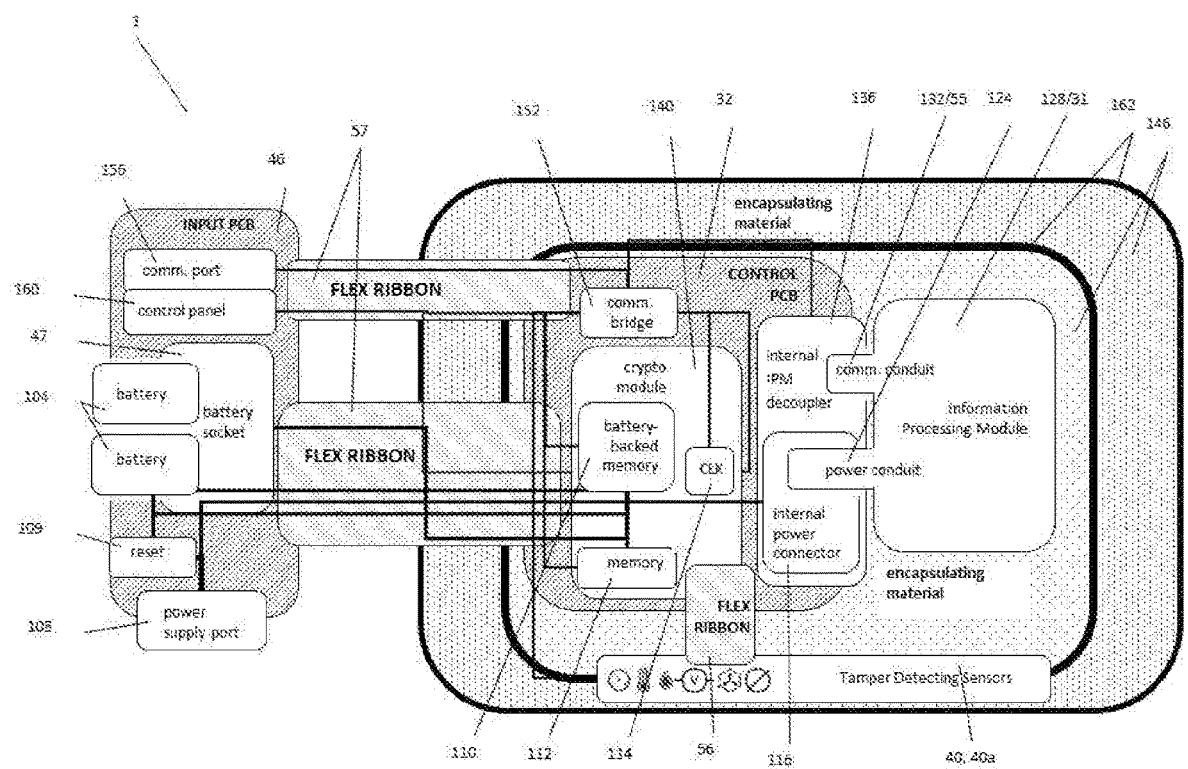
FIG. 14 is a schematic overview of a tamper-proof computer device according to the invention.
Figure 15:
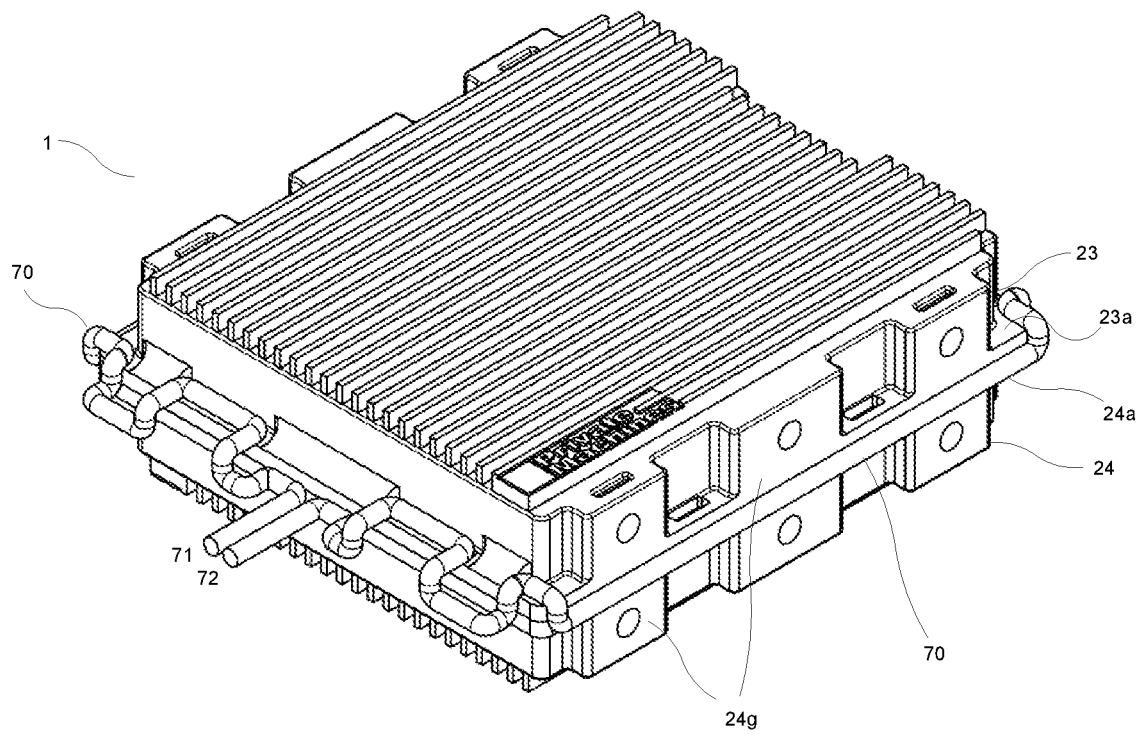
FIG. 15 illustrates the tamper-proof computer device shown in FIG. 1 with a curing device.

According to one embodiment illustrated in FIG. 14, only selected elements in the assembly that require curing are exposed to sufficient heat for a sufficient period of time. For example, only the flanges 23a and 24a can be heated up by a heat element 70, possibly custom designed to the particular device 1, such as arranged to be in close-enough proximity to (at least parts of) the flanges 23a, 24a. In FIG. 14, the element 70 is in the form of a pipe with an inlet 71 and an outlet 72, through which temperature-controlled (warm) liquid is circulated so as to heat the selected parts to be cured. The element 70 may be arranged as a separate part, which is useful for curing many devices 1 during manufacturing. The element 70 may in particular be arranged to be mounted completely exterior in relation to the device 1, and in particular to the enclosure 20. Preferably, there is local and direct thermal contact between the element 70 and the hollow metal body 20 of the device 1. This method has the important advantage of providing efficient curing while still protecting the inner electronic components from unnecessary heat exposure.

The assembly 10 is cooled down and the weights are removed. Alternately, the weights are removed first, and the assembly is then cooled down.

If not performed before, the cabling 57 connecting to the inner tamper-protecting circuitry 32 is now connected to the outer tamper-protecting circuitry 46.

The battery 47 is inserted, and the computer device 1 is powered on and activated.

Once activated, tests and post-activation steps may be performed, as the case may be. Reference is made to WO 2016/137573 A1 for examples and further details.

Thereafter, the method ends.

This way, a tamper-proof computer device 1 of the type described herein is achieved.

It is realized that certain of the above described method steps may be performed in slightly different order, and that for some configurations individual method steps may be omitted and other additional steps may be added.

The said mounting step may further comprise that the hollow metal body 20 is arranged to also enclose said metal heat sink structure 50 as described above, which metal heat sink structure 50 is then thermally connected to the computer processor 30 and arranged in direct thermal contact with said side 44 of at least one of the first 42 and second 43 membrane parts not facing the said inside surface 22, so that the membrane part in question is sandwiched between the hollow metal body 20 and the metal heat sink structure 50, with the result that thermal connection is achieved between the metal heat sink structure 50 and the enclosure 10, via the membrane part in question.

Moreover, the mounting step, and the method in general, may be conducted so that the membrane 41 is not fastened to the enclosure 10 using said adhesive, and in particular that the membrane 41 is arranged to run freely between the metal heat sink structure 50 and said hollow metal body 20, but being held in place by said sandwich arrangement.

In a particular embodiment, in said mounting step said at least two enclosure parts 23, 24 may be joined together using said at least two discreet metal fastening means 25, and said tamper-protection circuitry 46 may then be connected to the sealed membrane 41 container via said discreet metal fastening means 25. Then, the metal fastening means 25 may be used as a tamper-detection communication path for the circuitry 46.

Moreover, in the mounting step the first 42 and second 43 membrane parts may be pressed between the first 23 and second 24 enclosure parts between said respective cooperating flanges 23a, 24a of each of said first 23 and second 24 enclosure parts, forming the above described flanged pressing aggregate. As described, this flanged pressing aggregate may extend uninterrupted along said closed periphery of the hollow metal body 20 and said sealed membrane 41 container, apart for the above-described through cabling arranged to run between the inside of the membrane 41 and the outside of the membrane 41. Preferably, this through cabling is the only digital communication means provided for digital communication across the membrane 14 barrier, or at least the only wired such digital communication means. The cabling 41 may comprise both a digital and/or analog communication interface as well as power supply cables.

In particular, said flanged pressing aggregate may be provided with said hollow space 25b, by in the provision step providing a respective indentation 23c, 24c of at least one of the respective flanges 23a, 24a of said first 23 and second enclosure parts 24, which hollow space 25b receives and accommodates the first 42 and second 43 membrane parts in said arrangement or mounting step.

Furthermore, in this case, the said first 23 and second 24 enclosure parts may be directly attached one to the other, using the said adhesive, along the said contact line 25a extending uninterrupted along a complete or substantially complete closed periphery of the enclosure 10, peripherally externally to said periphery of the first 42 and second 43 membrane parts.

Moreover, the said flanges 23a, 24a may each comprise a respective flat part 23b, 24b of the above described type, arranged to abut flatly against a corresponding flat part of an adjacent enclosure part flange, wherein the said direct attachment is formed between said corresponding flat parts 23b, 24b.

FIG. 14 illustrates a schematic overview of an exemplifying embodiment of a computer device 1 according to the present invention, and with functionality as described in WO 2016/137573 A1. In particular, the above-mentioned flex ribbons 57 connecting from the inside 32 tamper-protecting circuitry to the outside tamper-protecting circuitry 46 may carry main power, battery power, control signals, networking and communication signals, and more. The inner tamper-protection circuitry 32 may then distribute some of these signals to the information processing module IPM 128.

The IPM 128 may comprise the inner circuit board 31 illustrated in FIGS. 1-11, the CPU 30 illustrated in FIG. 1-11, RAM, and other circuitry. In general, the IPM 128 may be built from mass-produced components familiar in the PC, server, smartphone and general mobile markets, such as an ARM Cortex-derived smartphone system on chip (SoC), the Raspberry Pi, Arduino, Banana Pi, and BeagleBone, and the Samsung Exynos ARM SoC, or it may be of a custom design. In particular, the IPM 128 itself may be of a standard, general-purpose type, since it is entirely arranged within the tamper-protecting membrane 41. There may be one or several IPM 128 components arranged within the enclosure 10. One or more of any IPM 128 used may include guidance circuitry, such as avionics guidance circuitry, naval guidance circuitry, satellite guidance circuitry, missile guidance circuitry. Additionally, or alternatively, the IPM 128 may include non-guidance circuitry, including digital signal processing (DSP) circuitry, such as the off-the-shelf Texas Instruments Ultra-lower Power DSP system on chip.

As described above, the tamper-protected computer device 1 comprises one or more layers of encapsulating material 146, in particular the membrane 41, within one or more enclosing layers 162. Integrated within at least one of said enclosing layers 162 there are tamper-detecting sensors 120, and in particular the sensor 40, as well as a number of components apart from the IPM 128, such as internal power connectors 116, IPM 128 connectors (or decouplers) 136, communication circuitry ("communication bridge") 152, a cryptographic module 140, a clock component 114, a digital memory component 112 and a battery-backed memory component 110.

The IPM 128 in turn comprises a communication conduit 132, arranged to provide a digital wired communication interface to the rest of the tamper-protected computer device 1 inside which the IPM 182 sits, and a power conduit 124, arranged to receive power.

The outer circuitry 46 of the tamper-protected computer device 1 may also comprise a number of externally accessible connectors, including a communication port 156 (e.g., Ethernet 10 Gbps connector), a control panel 160, a battery socket 47 (which may be arranged with batteries 104), a reset port 109, and a power port 108. Of course, other configuration are possible, in addition to the exemplifying one shown in FIGS. 1-11 and 14.

Above, preferred embodiments have been described. However, it is apparent to the skilled person that many modifications can be made to the disclosed embodiments without departing from the basic idea of the invention.

For instance, the computer device 1 may comprise additional parts, apart from the ones described above and illustrated in FIGS. 1-11. Hence, the hollow metal body 20 may comprise more than the one computer processor 30, and also a RAM memory, a ROM memory, a communication bus, flash memory, a hard drive, wireless communication means (such as WiFi and Bluetooth®), and so forth.

The computer device 1 may comprise wired communication means for communicating with the outside world, such as an ethernet connection. Also, the computer device 1 may comprise a power supply, for supplying the computer processor 30 with electric power.

In FIGS. 1-11, the enclosure 1 is illustrated with two cooperating enclosure parts 23, 24 of roughly the same size. It is, however, realized that more than two enclosure parts may be used, and/or enclosure parts of different shapes and sizes, together forming an enclosure of desired shape and size.

In general, everything which has been said herein about the computer device 1 is also useful for the manufacturing method, and vice versa, as applicable.

Hence, the invention is not limited to the described embodiments, but can be varied within the scope of the enclosed claims.

What is claimed is:

1. Tamper-proof computer device comprising
    a sealed enclosure, in turn comprising a hollow metal body having an inside surface;
    a computer processor, arranged inside said enclosure;
    a tamper-detection sensor, which sensor in turn comprises a tamper-detecting membrane forming a sealed container in which the computer processor is arranged, which membrane is arranged on, and in direct thermal contact with, the said hollow metal body; and
    a metal heat sink structure thermally connected to the computer processor,
    wherein the metal heat sink structure is also arranged in direct thermal contact with a side of the membrane not facing the said inside surface, so that the membrane is sandwiched between the hollow metal body and the metal heat sink structure so that thermal connection is achieved between the metal heat sink structure and the enclosure, via the membrane.

2. Tamper-proof computer device according to claim 1, wherein the hollow metal body, the membrane and the metal heat sink structure are sandwiched together across an area covering at least 10%, preferably at least 25%, most preferably at least 50%, of the total area of said inside surface.

3. Tamper-proof computer device according to claim 2, wherein the metal heat sink structure comprises a metal plate the shape of which is complementary to at least a part of the said inside surface.

4. Tamper-proof computer device according to claim 3, wherein the metal plate substantially has a trough shape.

5. Tamper-proof computer device according to claim 3, wherein the metal heat sink structure comprises a metal protruding part, thermally connected to the metal plate, protruding out from an inside of the metal plate, and arranged to be thermally connected to the computer processor.

6. Tamper-proof computer device according to claim 5, wherein the metal heat sink structure is at least partly, preferably completely, made from copper.

7. Tamper-proof computer device according to claim 1, wherein the enclosure comprises two enclosure parts, arranged to be fastened together forming said hollow metal body, wherein the tamper-detection sensor comprises two tamper-detecting membrane parts, each corresponding to a respective one of said enclosure parts and each covering a respective inside surface of the enclosure part in question, and wherein the membrane parts are pressed between the enclosure parts when the enclosure parts are joined together, hence forming the said sealed container.

8. Tamper-proof computer device according to claim 7, wherein the tamper-detecting membrane is connected to tamper-protection circuitry at least partly arranged externally to the sealed enclosure.

9. Tamper-proof computer device according to claim 8, wherein the said tamper-protection circuitry is powered by a battery arranged externally to the sealed enclosure.

10. Tamper-proof computer device according to claim 8, wherein the tamper-protection circuitry is connected to internal tamper-protection circuitry arranged inside the membrane by a connecting means running through a joint between the said at least two joined-together enclosure parts.

11. Tamper-proof computer device according to claim 7, wherein the said tamper-detecting membrane parts are joined together using an adhesive providing an adhesive joint the strength of which is at least as strong as the membrane itself.

12. Tamper-proof computer device according to claim 11, wherein enclosure parts are also joined together using said adhesive.

13. Tamper-proof computer device according to claim 11, wherein the membrane is not fastened to the enclosure apart from along said joint, and in particular that the membrane runs freely between the metal heat sink structure and said hollow metal body, but is held in place by said sandwich arrangement.

14. Tamper-proof computer device according to claim 7, wherein the tamper-detecting membrane is pressed between the two enclosure parts between a respective cooperating flange of each enclosure part, forming a flanged pressing aggregate preferably extending uninterrupted along a complete or substantially complete closed periphery of the enclosure.

15. Tamper-proof computer device according to claim 14, wherein said flanged pressing aggregate is arranged with a hollow space, provided by a respective indentation of at least one of the respective flanges of said enclosure parts, which hollow space is arranged to receive and accommodate the tamper-detecting membrane.

16. Tamper-proof computer device according to claim 15, wherein the said flanged pressing aggregate is further arranged so that the said enclosure parts are directly attached one to the other, using an adhesive, along a contact line extending uninterrupted along a complete or substantially complete closed periphery of the enclosure, peripherally externally to a periphery of the membrane.

17. Tamper-proof computer device according to claim 16, wherein the said flanges each comprises a respective flat part, arranged to abut flatly against a corresponding flat part of an adjacent enclosure part flange, hence forming a direct attachment surface of said direct attachment.

18. Tamper-proof computer device according to claim 1, wherein the hollow metal body comprises a gas, such as air.

19. Tamper-proof computer device according to claim 18, wherein the computer device further comprises a fan, arranged inside the hollow metal body and arranged to provide gas convection inside the hollow metal body.

20. Tamper-proof computer device according to claim 1, wherein the outside of the sealed enclosure comprises surface-increasing structure elements, such as a rib pattern.

21. Tamper-proof computer device according to claim 1, wherein a heat-expanding adhesive is arranged between the membrane and the metal heat sink structure.

22. Method for manufacturing a tamper-proof computer device of the type according to claim 1, wherein the method comprises the steps
   a) providing a first and a second enclosure part, as well as a first and a second tamper-detecting membrane part;
   b) arranging the first membrane part so that it covers an inside surface of the first enclosure part, and arranging the second membrane part so that it covers an inside surface of the second enclosure part;
   c) bringing the first and second enclosure parts together, so that they together form a closed a hollow metal body having an inside surface which is covered by said first and second membrane parts, which hollow metal body encloses a computer processor, wherein the first and second membrane parts are pressed together between said first and second enclosure parts along a closed periphery along the hollow metal body; and
   d) permanently sealing the hollow metal body using an adhesive applied along an adhesive joint arranged along said closed periphery.

23. Method according to claim 22, wherein in step c) the hollow metal body also is arranged to enclose a metal heat sink structure thermally connected to the computer processor and in direct thermal contact with a side of at least one of the first and second membrane parts not facing the said inside surface, so that the membrane part in question is sandwiched between the hollow metal body and the metal heat sink structure so that thermal connection is achieved between the metal heat sink structure and the enclosure, via the membrane part in question.

24. Method according to claim 23, wherein in step c) a heat-expanding adhesive is arranged between the membrane and the metal heat sink structure.

25. Method according to claim 22, wherein the first and second membrane parts after step d) form a sealed container enclosing the computer processor.

26. Method according to claim 25, wherein the method further comprises that the sealed container is connected to tamper-protection circuitry at least partly arranged externally to the sealed enclosure.

27. Method according to claim 22, wherein the adhesive is a curing adhesive, and wherein step d) comprises a curing step curing the adhesive.

28. Method according to claim 22, wherein in step c) the first and second membrane parts are pressed between the first and second enclosure parts between a respective cooperating flange of each of said first and second enclosure part, forming a flanged pressing aggregate preferably extending uninterrupted along said closed periphery of the hollow metal body.

29. Method according to claim 28, wherein said flanged pressing aggregate is provided with a hollow space, by providing a respective indentation of at least one of the respective flanges of said first and second enclosure parts, which hollow space receives and accommodates the first and second membrane parts.

30. Method according to claim 29, wherein the said first and second enclosure parts are directly attached one to the other, using the adhesive, along a contact line extending uninterrupted along a complete or substantially complete closed periphery of the enclosure, peripherally externally to a periphery of the first and second membrane parts.

31. Method according to claim 30, wherein the said flanges each comprises a respective flat part, arranged to abut flatly against a corresponding flat part of an adjacent enclosure part flange, and wherein said direct attachment is formed between said corresponding flat parts.

32. Method for manufacturing a tamper-proof computer device of the type according to claim 1, wherein the method comprises the steps
   a) providing a first and a second enclosure part, as well as a first and a second tamper-detecting membrane part;
   b) arranging the first membrane part so that it covers an inside surface of the first enclosure part, and arranging the second membrane part so that it covers an inside surface of the second enclosure part;
   c) bringing the first and second enclosure parts together, so that they together form a closed a hollow metal body having an inside surface which is covered by said first and second membrane parts, and so that said first and second membrane parts together form a sealed container in which the computer processor is arranged; and
   d) permanently sealing the hollow metal body along said closed periphery,
and wherein in step c) the hollow metal body also is arranged to enclose a metal heat sink structure thermally connected to the computer processor and in direct thermal contact with a side of at least one of the first and second membrane parts not facing the said inside surface, so that the membrane part in question is sandwiched between the hollow metal body and the metal heat sink structure so that thermal connection is achieved between the metal heat sink structure and the enclosure, via the membrane part in question.

* * * * *